(12) United States Patent
Takeuchi

(10) Patent No.: US 10,511,774 B2
(45) Date of Patent: Dec. 17, 2019

(54) IMAGE PICK-UP APPARATUS AND CONTROL METHOD

(71) Applicant: CANON KABUSHIKI KAISHA, Tokyo (JP)

(72) Inventor: Kenji Takeuchi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/032,175

(22) Filed: Jul. 11, 2018

(65) Prior Publication Data
US 2019/0045126 A1 Feb. 7, 2019

(30) Foreign Application Priority Data
Aug. 3, 2017 (JP) .................. 2017-150810

(51) Int. Cl.
*H04N 5/232* (2006.01)
*H04N 19/513* (2014.01)
(Continued)

(52) U.S. Cl.
CPC ..... *H04N 5/23267* (2013.01); *G02B 27/0037* (2013.01); *H04N 5/145* (2013.01);
(Continued)

(58) Field of Classification Search
CPC ........... H04N 5/23267; H04N 5/23287; H04N 5/23258; H04N 5/23254; H04N 19/513; H04N 5/145; G02B 27/0037
See application file for complete search history.

(56) References Cited

U.S. PATENT DOCUMENTS

2005/0185058 A1* 8/2005 Sablak ............... H04N 5/23248
348/208.99
2011/0105181 A1* 5/2011 McLeod ............ H04N 5/23248
455/556.1
(Continued)

FOREIGN PATENT DOCUMENTS

JP 2010-093362 A 4/2010

OTHER PUBLICATIONS

The above patent documents were cited in a British Search Report issued on Jan. 29, 2019, which is unclosed, that issued in the corresponding U.K. Patent Application No. 1812266.3.

*Primary Examiner* — Nhan T Tran
(74) *Attorney, Agent, or Firm* — Cowan, Liebowitz & Latman, P.C.

(57) ABSTRACT

An image pick-up apparatus detects shake and the like applied to an image pick-up apparatus by a vibration sensor. A motion vector detection unit detects a motion vector of an image in an image signal by an imaging unit. A feature point tracking unit calculates coordinate values of a subject on an imaging screen that changes over time on the basis of the motion vector. A feature coordinate map and a position and attitude estimation unit estimates a position and attitude of the image pick-up apparatus and a positional relationship including a depth between the subject and the image pick-up apparatus based on an output of the vibration sensor and the coordinate values of the subject. A computation unit calculates a control amount of image blur correction using feature points of a main subject, a feature coordinate map and position or attitude information of the image pick-up apparatus. A correction lens is driven according to an output of a target position calculation unit and a shake correction operation of the image pick-up apparatus is performed.

17 Claims, 10 Drawing Sheets

(51) Int. Cl.
    *G02B 27/00*    (2006.01)
    *H04N 5/14*    (2006.01)
(52) U.S. Cl.
    CPC ..... *H04N 5/23254* (2013.01); *H04N 5/23258* (2013.01); *H04N 5/23287* (2013.01); *H04N 19/513* (2014.11)

(56) References Cited

U.S. PATENT DOCUMENTS

| | | | | |
|---|---|---|---|---|
| 2011/0157380 A1* | 6/2011 | Yamazaki | .......... | H04N 5/23248 348/208.4 |
| 2011/0261225 A1* | 10/2011 | Niinami | ............. | H04N 5/23212 348/223.1 |
| 2011/0304706 A1* | 12/2011 | Border | ................... | G03B 35/02 348/50 |
| 2016/0261784 A1* | 9/2016 | Mukunashi | .......... | H04N 5/2353 |
| 2017/0026581 A1* | 1/2017 | Ryu | .................... | G06K 9/6211 |

* cited by examiner

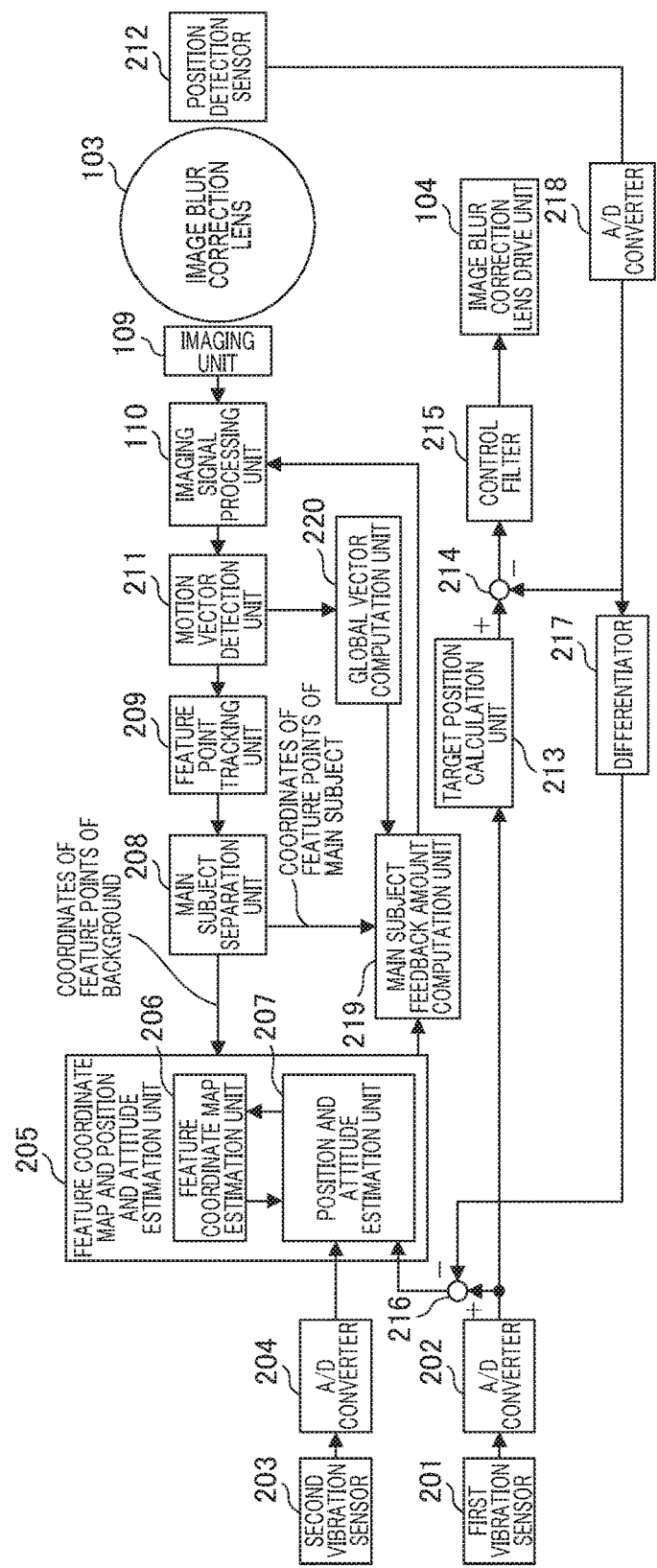

IMAGE PICK-UP APPARATUS AND CONTROL METHOD

BACKGROUND OF THE INVENTION

Field of the Invention

The present invention relates to an image blur correction technology for an optical device such as a video camera, a digital still camera, and an interchangeable lens thereof.

Description of the Related Art

An optical image blur correction process and an electronic image blur correction process are provided as functions for correcting image blur of a subject that is generated due to hand shake or the like of a user who holds a main body part of an image pick-up apparatus. In the optical image blur correction process, a vibration of the main body part is detected by an angular velocity sensor or the like, and control is performed so that a correction lens provided in an imaging optical system is moved according to the detection result. When an optical axis direction of the imaging optical system is changed, and an image that is formed on a light receiving surface of an image pickup element is moved, image blur can be corrected. In addition, in the electronic image blur correction process, image blur is artificially corrected by performing image processing on a captured image.

Photographers have a desire to perform imaging while moving with a subject (a moving object or a stationary object) and keeping the subject within an angle of imaging view. An operation of tracking a selected subject so that a detection position of a subject form is close a specific position in an imaging screen may be referred to as a "subject tracking operation." A movement intended by the photographer at that time is referred to as "camera work." For example, movement of an image pick-up apparatus by a user to bring a detected subject position to (or near) a specific position in the apparatus's imaging screen may be referred to as camera work. The terms "subject tracking operation" and "camera work" are used throughout the application. The specific position may be, for example, a center position of the imaging screen or a position designated by the photographer. In addition, there is a method of assisting the subject tracking operation by an image blur correction unit. In Japanese Patent Laid-Open No. 2010-93362, a subject tracking technology for driving an image blur correction unit in which the inside of a screen is divided into blocks, the face or the like of a subject is detected by template matching, and a movement of the subject is tracked and set to be within the screen is disclosed.

On the other hand, in order to correct image blur due to hand shake or the like, it is necessary to detect a change in the position and attitude of the image pick-up apparatus. As a self-position estimation method for detecting an attitude and position of the image pick-up apparatus, a position and attitude estimation (visual and inertial sensor fusion) technology using structure from motion (SFM) and an inertial sensor is provided. A method of estimating a 3D position of an object present in a real space and a position and attitude of an image pick-up apparatus by applying this technology is known.

In the method disclosed in Japanese Patent Laid-Open No. 2010-93362, a shake correction operation is performed on the basis of change in the position and attitude of the image pick-up apparatus in which camera work that is intentionally performed by a photographer for subject tracking and change in position and attitude due to hand shake coexist. However, an issue with present shake correction operations is that they may cancel out changes in position and/or attitude of an image pick-up apparatus that arise from camera work. This is of course undesirable because camera work by a photographer is essentially a desired movement for following a subject with the image pick-up apparatus. As a result, present shake correction operations may lead to an unnatural change in angle of view in a captured image.

SUMMARY OF THE INVENTION

The present invention reduces an unnatural change in angle of view due to image blur correction in imaging according to camera work.

An apparatus according to an embodiment of the present invention is an image pick-up apparatus that acquires an image signal by an imaging unit, the apparatus including a memory; and one or more processors, wherein the processor functions as the following units according to a program stored in the memory: a first acquisition unit configured to acquire first information indicating shake of the image pick-up apparatus detected by a shake detection unit; a second acquisition unit configured to acquire second information indicating a movement of a subject detected in an image signal by the imaging unit; a tracking unit configured to calculate coordinate values of the subject on an imaging screen using the second information and track feature points; an estimation unit configured to estimate a position and/or attitude of the image pick-up apparatus and a positional relationship including a depth between the subject and the image pick-up apparatus from the first information and the coordinate values of the subject; a computation unit configured to calculate a control amount of shake correction using (i) the estimation value of the position or attitude of the image pick-up apparatus acquired from the estimation unit, (ii) the positional relationship acquired from the estimation unit, (iii) the first information and (iv) the calculated coordinate values of the subject; and a correction unit configured to correct image blur due to shake of the image pick-up apparatus based on the control amount calculated by the computation unit.

Further features, advantages and aspects of the present invention will become apparent from the following description of exemplary embodiments (with reference to the attached drawings). It should be understood that any of the features described herein in relation to a particular embodiment or set of embodiments may be combined with the features of one or more other embodiments without any limitations other than those imparted by the broadest aspects of the invention as defined hereinabove. In particular, features from different embodiments can be combined where necessary or where the combination of elements or features from individual embodiments in a single embodiment is beneficial.

BRIEF DESCRIPTION OF THE DRAWINGS

FIG. 11 is a diagram showing a configuration example of an image blur correction device according to a second embodiment of the present invention.

DESCRIPTION OF THE EMBODIMENTS

Embodiments of the present invention will be described with reference to the appended drawings. In the embodiments, an image blur correction device configured to perform image blur correction on a captured image is exemplified. The image blur correction device is configured to drive and control a movable member and the like of an image blur correction optical system. The image blur correction device and/or the image blur correction optical system can be mounted in an image pick-up apparatus such as a video camera, a digital camera, a silver salt still camera and an optical device (e.g. an observation device such as binoculars, a telescope, and a field scope). In addition, the image blur correction device can be mounted in an optical device such as an interchangeable lens for a digital single-lens reflex camera. An operation of performing image blur correction using a shake detection signal of a device will be referred to below as an "image blur correction operation."

First Embodiment

Figure 1:
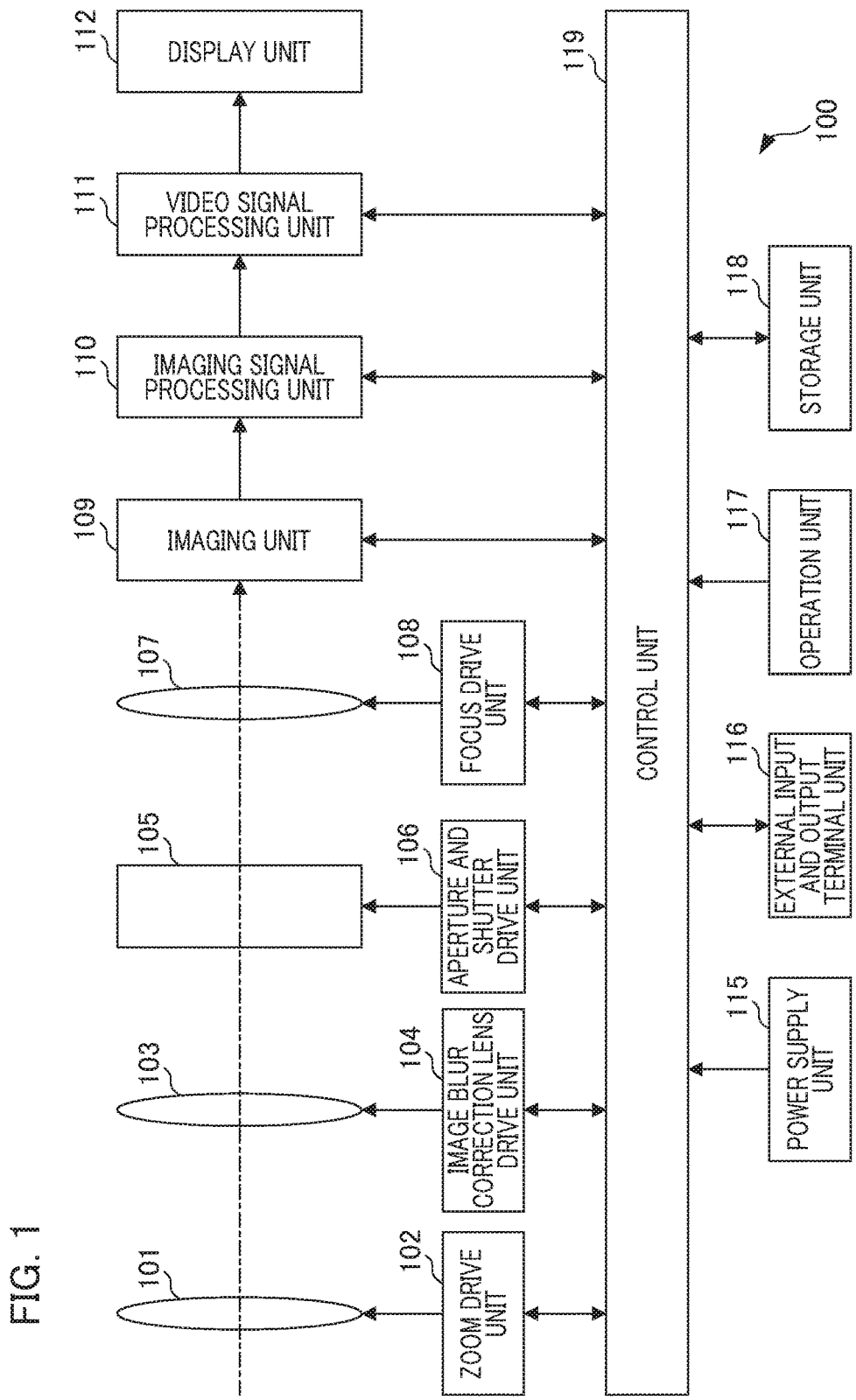
FIG. 1 is a diagram showing a configuration example of an image pick-up apparatus according to an embodiment of the present invention.

FIG. 1 is a block diagram showing a configuration example of an image pick-up apparatus according to the present embodiment. The image pick-up apparatus 100 is, for example, a digital still camera, and has a moving image capturing function.

An image pick-up apparatus 100 includes a zoom unit 101. The zoom unit 101 constitutes an image forming optical system and includes a zoom lens by which an imaging magnification is changed. A zoom drive unit 102 drives the zoom unit 101 according to a control signal from a control unit 119. An image blur correction lens (hereinafter referred to as a correction lens) 103 is a movable optical member that can be moved to correct image blur. The correction lens 103 is movable in a direction orthogonal to an optical axis of an imaging optical system. An image blur correction lens drive unit 104 controls driving of the correction lens 103 according to a control signal from the control unit 119. An aperture and shutter unit 105 includes a mechanical shutter having an aperture function. An aperture and shutter drive unit 106 drives the aperture and shutter unit 105 according to a control signal from the control unit 119. A focus lens 107 is a movable lens that is used for focus adjustment, and has a position that can be changed along the optical axis of the imaging optical system. A focus drive unit 108 drives the focus lens 107 according to a control signal from the control unit 119.

The imaging optical system forms an image on an image unit 109. An image pickup element (such as a CCD image sensor and a CMOS image sensor) of the imaging unit 109 converts the optical image into an electrical signal representative of the image. The electrical representation of the image may be formed of pixels. The term CCD is an abbreviation of a "charge coupled device." The term CMOS is an abbreviation of a "complementary metal-oxide semiconductor." An imaging signal processing unit 110 performs analog/digital (A/D) conversion, correlated double sampling, gamma correction, white balance correction, color interpolation processing, and the like on the electrical signal output from the imaging unit 109, and converts it into a video signal.

A video signal processing unit 111 processes the video signal acquired from the imaging signal processing unit 110 according to various applications. Specifically, the video signal processing unit 111 generates a video signal for display and performs an encoding process and a data file conversion process for recording. A display unit 112 performs image display as necessary according to a video signal for display output from the video signal processing unit 111. A power supply unit 115 supplies power to respective units of the image pick-up apparatus 100 according to applications. An external input and output terminal unit 116 is used to input and output a communication signal and a video signal to and from an external device. An operation unit 117 includes operation members such as buttons and switches for a user to issue an instruction to the image pick-up apparatus 100. For example, the operation unit 117 may include a release switch configured to sequentially turn a first switch (denoted as an SW1) and a second switch (denoted as an SW2) on according to an amount pushing of a release button. In addition, the operation unit 117 includes switches for setting various modes. A storage unit 118 stores various types of data including video information and the like.

The control unit 119 includes, for example, a CPU, a ROM, and a RAM. The CPU is an abbreviation of a "central processing unit." The ROM is an abbreviation of a "read only memory." The RAM is an abbreviation of a "random access memory." The CPU loads a control program stored in the ROM into the RAM and executes it, controls respective units of the image pick-up apparatus 100, and realizes various operations to be described below. When the SW1 is turned on by a half-pressing operation of the release button included in the operation unit 117, the control unit 119 calculates an auto focus (AF) evaluation value on the basis of a video signal for display that is output from the video signal processing unit 111 to the display unit 112. The control unit 119 controls the focus drive unit 108 on the basis of the AF evaluation value and thereby performs automatic focus detection and focus adjustment control. In addition, the control unit 119 performs automatic exposure (AE) processing for determining an aperture value and a shutter speed for obtaining an appropriate exposure amount on the basis of video signal luminance information and a predetermined program line diagram. In addition, when the SW2 is turned on by a full-pressing operation of the release button, the control unit 119 performs an imaging process with the determined aperture value and shutter speed, and controls respective processing units so that image data obtained by the imaging unit 109 is stored in the storage unit 118.

The operation unit 117 includes an operation switch that is used to select an image blur correction (stabilizing) mode. When an image blur correction mode is selected by an operation of the operation switch, the control unit 119 instructs the image blur correction lens drive unit 104 to perform an image blur correction operation. The image blur correction lens drive unit 104 performs an image blur correction operation according to a control instruction of the control unit 119 until an instruction of turning image blur correction off is issued. In addition, the operation unit 117 includes an imaging mode selection switch that can select either a still image imaging mode or a moving image imaging mode. A process of selecting an imaging mode is performed by a user operation of the imaging mode selection switch, and the control unit 119 changes operation conditions of the image blur correction lens drive unit 104. The image blur correction lens drive unit 104 constitutes the image blur correction device of the present embodiment. In addition, the operation unit 117 includes a reproduction mode selection switch for selecting a reproduction mode. When a user selects a reproduction mode by an operation of the reproduction mode selection switch, the control unit 119 performs control so that the image blur correction operation is stopped. In addition, the operation unit 117 includes a magnification change switch for instructing zoom magnification change. When zoom magnification change is instructed according to a user operation of a magnification change switch, the zoom drive unit 102 that has received the instruction from the control unit 119 drives the zoom unit 101 and moves the zoom lens to the instructed position.

Figure 2:
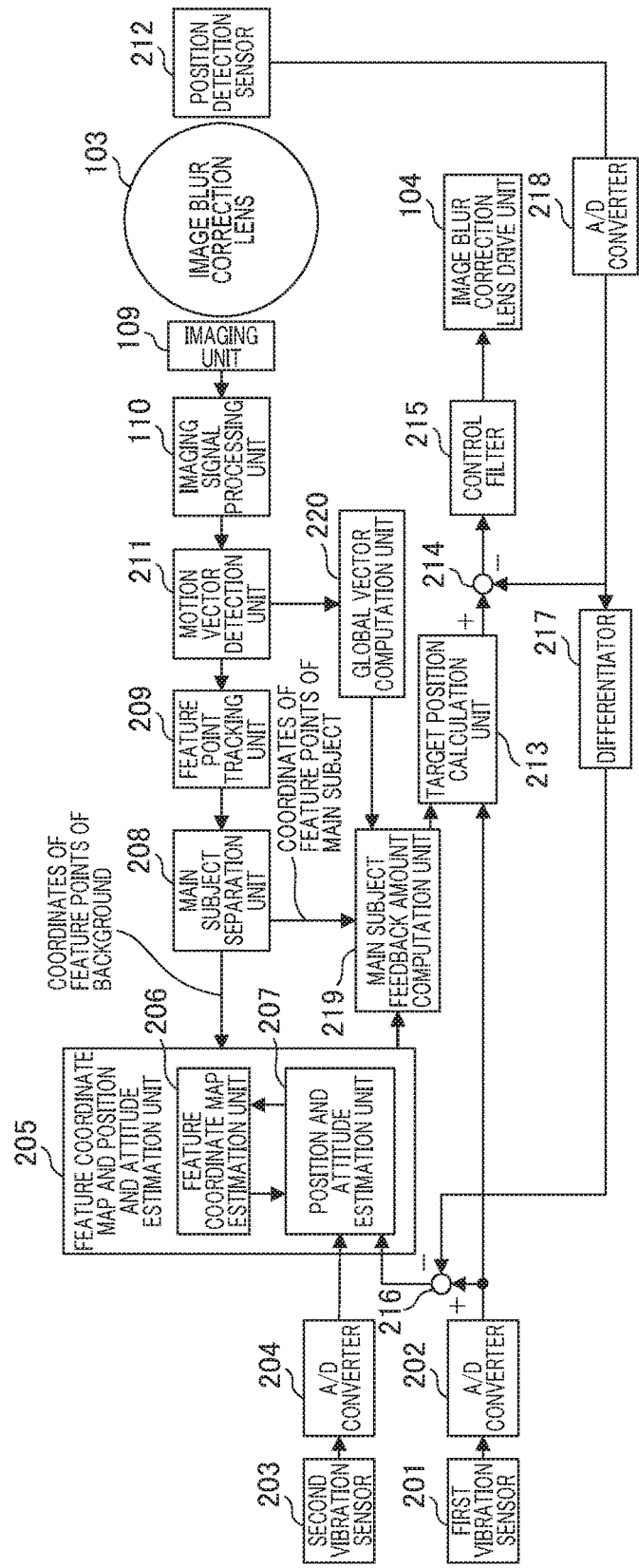
FIG. 2 is a diagram showing a configuration example of an image blur correction device according to a first embodiment of the present invention.

FIG. 2 is a diagram showing a configuration example of the image blur correction device of the present embodiment. A process of calculating a drive direction and a drive amount regarding the correction lens 103 and position control will be described below. The image blur correction device of the present embodiment includes a first vibration sensor 201 and a second vibration sensor 203. The first vibration sensor 201 is, for example, an angular velocity sensor. The first vibration sensor 201 detects vibration components (angular velocity) in a vertical direction (pitch direction), a horizontal direction (yaw direction), and a rotation direction (roll direction) around an optical axis of the image pick-up apparatus 100 in a general attitude (an attitude in which a long side direction of an imaging screen substantially matches a horizontal direction). The first vibration sensor 201 outputs a detection signal to an A/D converter 202. The second vibration sensor 203 is, for example, an acceleration sensor. The second vibration sensor 203 detects an acceleration component in a vertical direction, an acceleration component in a horizontal direction, and an acceleration component in an optical axis direction of the image pick-up apparatus 100 in a general attitude, and the second vibration sensor 203 outputs a detection signal to an A/D converter 204. The A/D converters 202 and 204 acquire detection signals from the first and second vibration sensors, and convert analog values to digital values. Here, while a case in which the shake detection unit includes the first vibration sensor and the second vibration sensor has been exemplified in the present embodiment, the present invention can be applied to an embodiment in which the first vibration sensor or the second vibration sensor is included.

A position detection sensor 212 detects a position of the correction lens 103 and outputs a position detection signal to an A/D converter 218. The A/D converter 218 acquires a detection signal from the position detection sensor 212 and converts analog values into digital values.

A target position calculation unit 213 calculates a control target position of the correction lens 103 based on outputs from the A/D converter 202 and a computation unit 219 to be described below. The target position calculation unit 213 outputs a corrected position control signal of the correction lens 103 in a pitch direction and a yaw direction to a subtractor 214. The subtractor 214 subtracts a position detection signal from a corrected position control signal. The position detection signal may be received from the position detection sensor 212 via the A/D converter 218, and the corrected position control signal is received from the target position calculation unit 213. The output from the subtractor 214 is provided to a control filter 215. The control filter 215 acquires the corrected position control signal from the target position calculation unit 213, together with a deviation of position information of the correction lens 103 from the position detection sensor 212, and performs feedback control. That is, the control filter 215 outputs a control signal for image blur correction to the image blur correction lens drive unit 104 (which has an actuator) and performs drive control of the correction lens 103.

Next, a drive control operation of the correction lens 103 by the image blur correction device will be described in detail.

The target position calculation unit 213 (which may be referred to herein as an acquisition unit) acquires a shake detection signal (angular velocity signal) from the first vibration sensor 201 and a main subject feedback amount from the computation unit 219, and generates a corrected position control signal for driving the correction lens 103 in a pitch direction and a yaw direction. The corrected position control signal is output to the control filter 215 through the subtractor 214.

The position detection sensor 212 detects a position of the correction lens 103 in a pitch direction and a yaw direction, and outputs a position detection signal to the control filter 215 through (i.e. via) the A/D converter 218 and the subtractor 214. The subtractor 214 outputs a signal obtained by subtracting the position detection signal from the corrected position control signal to the control filter 215. The control filter 215 performs feedback control through the image blur correction lens drive unit 104 so that a position detection signal value converges to a value of the corrected position control signal from the target position calculation unit 213. The corrected position control signal output from the target position calculation unit 213 is a control signal for moving the correction lens 103 so that image blur of a subject is canceled out. For example, the target position calculation unit 213 performs filter processing or the like on shake detection information and generates a correction speed control signal or a corrected position control signal. When vibration such as hand shake is applied to the image pick-up apparatus during imaging, image blur can be reduced up to a certain extent of vibration according to a control operation of moving the correction lens 103.

Figure 3A:
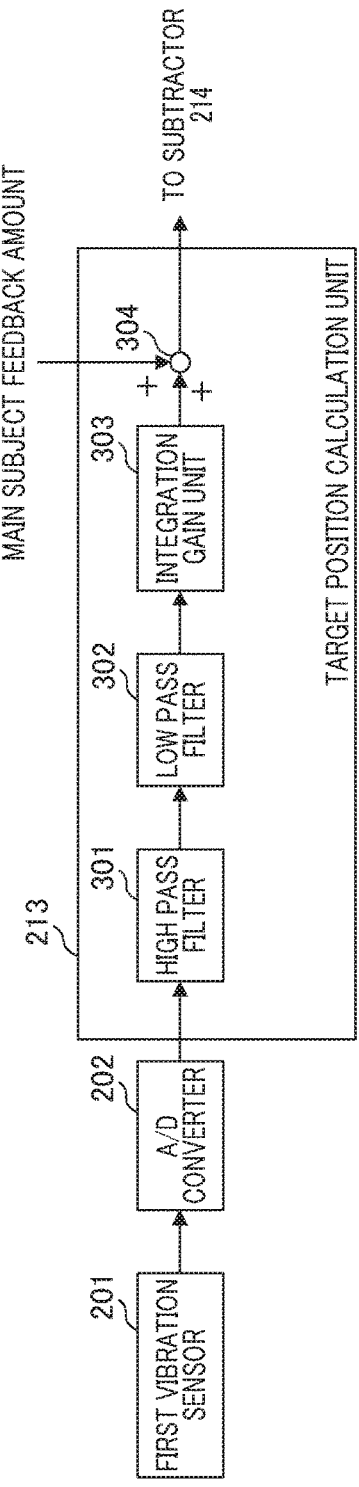
FIG. 3A and FIG. 3B show diagrams of a configuration of a target position calculation unit, and a main subject feedback amount computation unit.

FIG. 3A is a block diagram showing a detailed internal configuration of the target position calculation unit 213. A high pass filter 301 performs a process of removing a direct current (DC) offset component of a detection signal from the first vibration sensor 201. A low pass filter 302 performs a process of converting an angular velocity signal into a signal corresponding to an angle. An integration gain unit 303 multiplies an output of the low pass filter 302 by a predetermined integration gain. An adder 304 adds an output of the integration gain unit 303 and a main subject feedback amount. A main subject feedback amount which is a control amount of shake correction will be described below.

Figure 4:
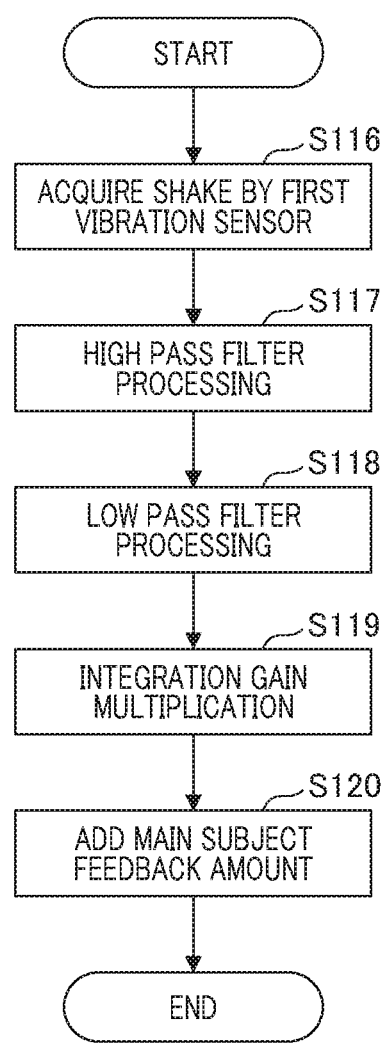
FIG. 4 is a flowchart of a target position calculation process according to the first embodiment.

A target position calculation process will be described with reference to FIG. 4. FIG. 4 is a flowchart showing a flow of the target position calculation process. The target position calculation unit 213 acquires data of a shake angular velocity of the image pick-up apparatus 100 detected by the first vibration sensor 201 (S116). The high pass filter 301 removes a DC offset component from the acquired data (S117). In addition, filter processing is performed by the low pass filter 302 (S118), the integration gain unit 303 multiplies by a gain and an angular velocity signal of a shake component is convened into an angle signal (S119). The adder 304 adds the main subject feedback amount calculated by the computation unit 219 and an output of the integration gain unit 303 (S120). The addition result is output to the subtractor 214.

Next, a configuration in which a motion vector is detected in a captured image and feature points are tracked, and a position and attitude of the image pick-up apparatus are estimated will be described with reference to FIG. 2. Image data acquired by the imaging unit 109 is processed by the imaging signal processing unit 110. A motion vector detection unit 211 (which may be referred to herein as an acquisition unit) detects a motion vector of the captured image in the signal output from the imaging signal processing unit 110. A global vector computation unit 220 calculates a global vector representing a uniform movement of the entire imaging screen based on detected motion vector information. A global vector is calculated using a motion vector having the highest frequency of occurrence, and global vector information is transmitted to the main subject feedback amount computation unit 219. A feature point tracking unit 209 performs a process of detecting and tracking a predetermined feature point in the captured image based on the detected motion vector information. Herein, the feature point tracking unit 209 may simply be referred to as a tracking unit.

A main subject separation unit 208 acquires an output of the feature point tracking unit 209 and specifies a coordinate area of a main subject in the captured image. The main subject is an important subject, and is determined by an image size, features of a subject (e.g. the face of a person), an operation by a photographer, and the like. The main subject separation unit 208 extracts feature points of the main subject corresponding to tracking feature points, and separates a movement of the other feature points (such as the background). The main subject separation unit 208 outputs coordinates of feature points of the main subject to the computation unit 219, and outputs coordinates of feature points of the background other than the main subject to a feature coordinate map and position and attitude estimation unit 205.

The feature coordinate map and position and attitude estimation unit 205 estimates a position and attitude of the image pick-up apparatus 100 and a position of a feature point in a real space in which the image pick-up apparatus 100 captures an image using SFM and inertial sensor information. The feature coordinate map and position and attitude estimation unit (hereinafter simply referred to as an estimation unit) 205 includes a feature coordinate map estimation unit 206 and a position and attitude estimation unit 207. An estimation process performed by the feature coordinate map estimation unit 206 and the position and attitude estimation unit 207 will be described below in detail.

Figure 5:
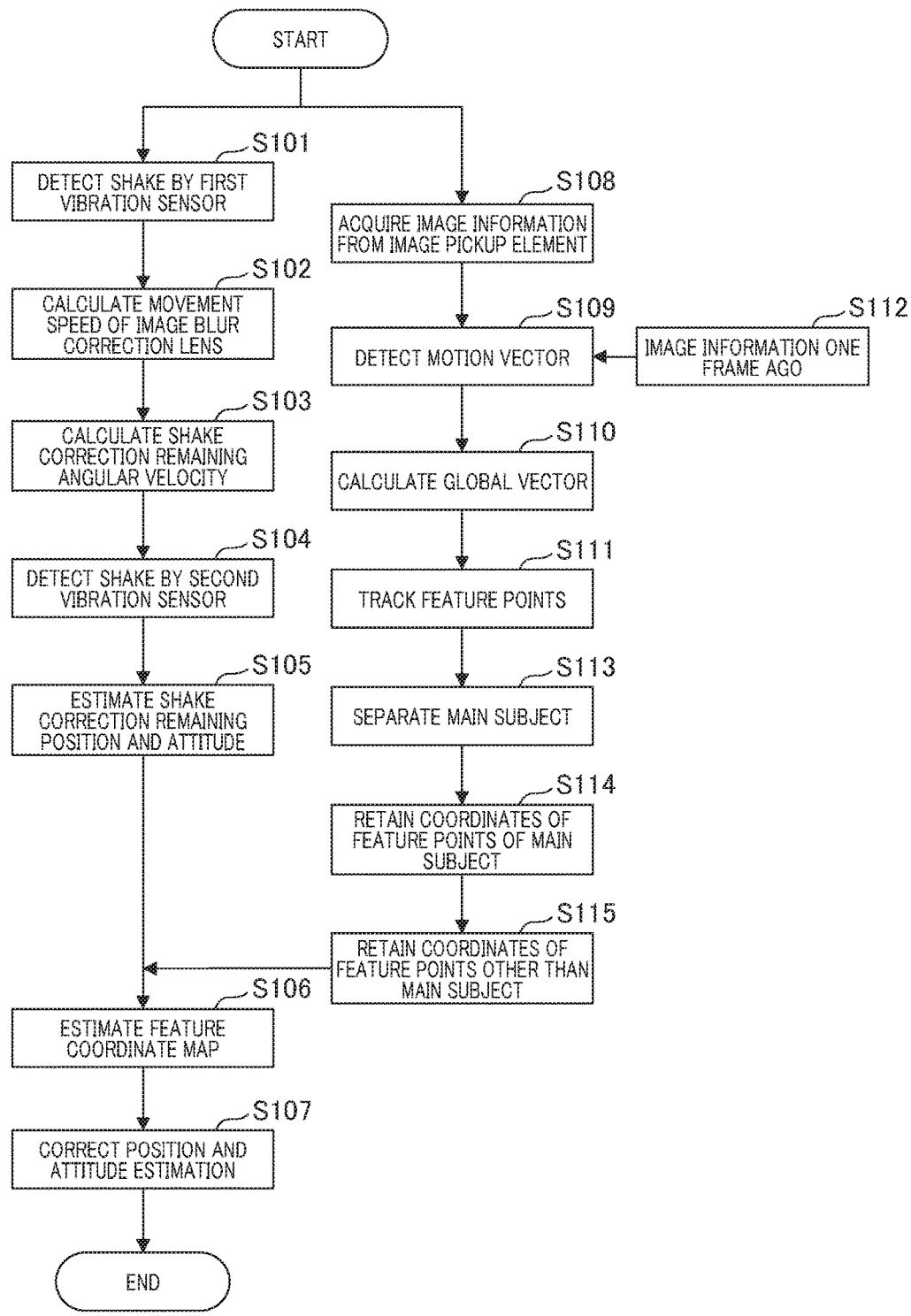
FIG. 5 is a flowchart of a position and attitude estimation process according to the first embodiment.

A position and attitude estimation process performed by the estimation unit 205 will be described with reference to a flowchart in FIG. 5. The processes of S101 to S105 and the processes of S108 to S115 are performed in parallel. First, the processes of S108 to S115 will be described.

The imaging unit 109 photoelectrically converts an optical signal formed through the imaging optical system into an electrical signal and acquires an analog image signal (S108). Next, the imaging signal processing unit 110 converts the analog image signal acquired from the imaging unit 109 into a digital image signal and performs predetermined image processing. The motion vector detection unit 211 detects a motion vector on the basis of the image signal (S109). When the motion vector is detected, an image signal one frame ago stored in a memory in advance is acquired (S112). This image signal and an image signal of the current frame are compared, and a motion vector is calculated from a displacement of the image. A method of detecting a motion vector includes a correlation method and a block matching method. A method of calculating a motion vector in the present invention is arbitrary.

The global vector computation unit 220 calculates a global vector from the detected motion vector information of the image (S110). When a motion vector value having the highest frequency of occurrence in the captured image is calculated in a known histogram process or the like, a global vector is calculated. The feature point tracking unit 209 detects and tracks a movement position of a predetermined feature point in the captured image in coordinates of each frame when a moving image is captured (S111). Regarding a feature point tracking technology, there is a method in which a square window is provided around a feature point, and when a new frame of a target video is provided, a point having the smallest residual in the window between frames is obtained. A tracking process may be performed using a known method, and details thereof will not be described.

The main subject separation unit 208 specifies a coordinate area of the main subject in the captured image, extracts feature points of the main subject corresponding to tracking feature points, and separates movement of the other feature points (S113). Here, an area other than the main subject is set as a background area. As a subject detection method, for example, there is a method in which color information is acquired from an image signal, histograms thereof are divided into mountain-like distribution ranges, and partitioned areas are classified as one subject, and the subject is detected. According to classification into a plurality of areas having similar image signals, it is possible to distinguish and detect a plurality of subjects. In addition, in moving image capturing, in each imaging frame, there are feature points that are continuously present in the captured image, and a feature point of which a movement amount is different from other detected feature points and which has a smaller movement amount than the others is determined as a main subject. On the other hand, a feature point that disappears (leaves an angle of imaging view) from the captured image in each imaging frame, or a feature point having a movement amount with the same degree as other detected feature points is determined as a feature point other than the main subject. This is a method in which a difference of movement in the captured image between the main subject for which a photographer has an aim that it should intentionally be within an angle of imaging view and other subjects that are unintentionally moved due to hand shake or the like is used for determination. Feature point coordinates belonging to the partitioned main subject area are retained in a predetermined storage area in the memory (S114). Feature point coordinates belonging to areas other than the main subject, for example, a background area, are retained in a predetermined storage area in the memory (S115). Next, the process advances to S106.

Next, a position and attitude estimation process will be described with reference to FIG. 2 and S101 to S107 in FIG. 5.

The position and attitude estimation unit 207 acquires a shake detection signal from the first vibration sensor 201 (S101). A differentiator 217 in FIG. 2 performs a differential operation on an output of the A/D converter 218 and outputs the computation result to a subtractor 216. When a difference of position detection signals between imaging frames of the correction lens 103 is calculated, a movement speed of the correction lens 103 is calculated (S102).

The subtractor 216 acquires outputs of the A/D converter 202 and the differentiator 217, subtracts a movement speed of the correction lens 103 from angular velocity detection information according to the first vibration sensor 201, and thereby calculates information corresponding to a shake correction remaining angular velocity of the image pick-up apparatus 100 (S103). The output of the subtractor 216 is input to the position and attitude estimation unit 207 in FIG. 2. The position and attitude estimation unit 207 acquires acceleration information applied to the image pick-up apparatus 100 detected from the A/D converter 204 by the second vibration sensor 203 (S104). The position and attitude estimation unit 207 estimates a position and attitude of the image pick-up apparatus 100 in the real space (S105). The feature coordinate map estimation unit 206 estimates 3D position coordinates including a depth of a feature point in the real space for the image pick-up apparatus and generates a feature coordinate map (S106). The feature coordinate map is a map of 3D position coordinates estimated on the basis of the estimated position and attitude information of the image pick-up apparatus 100 and coordinate change information of frames of the moving image according to 2D feature points in the captured image other than the main subject calculated by the main subject separation unit 208.

The position and attitude estimation unit 207 corrects position and attitude estimation values obtained in S105 based on feature coordinate map information, the estimated position and attitude of the image pick-up apparatus 100, and 2D feature point coordinates in the captured image other than the main subject calculated by the main subject separation unit 208 (S107). When the process of estimating a position and attitude and the process of estimating a feature coordinate map are repeatedly performed for frames of the moving image, it is possible to correctly estimate a position and attitude. Here, position and attitude estimation information in S105 is calculated from coordinates of feature points calculated from the image when shake correction is performed by the correction lens 103 and a shake correction remaining angle obtained by subtracting a movement speed of the correction lens 103 from angular velocity detection information according to the first vibration sensor 201. The position and attitude estimation values and feature coordinate map information according to the estimation unit 205 are output to the computation unit 219.

Figure 3B:
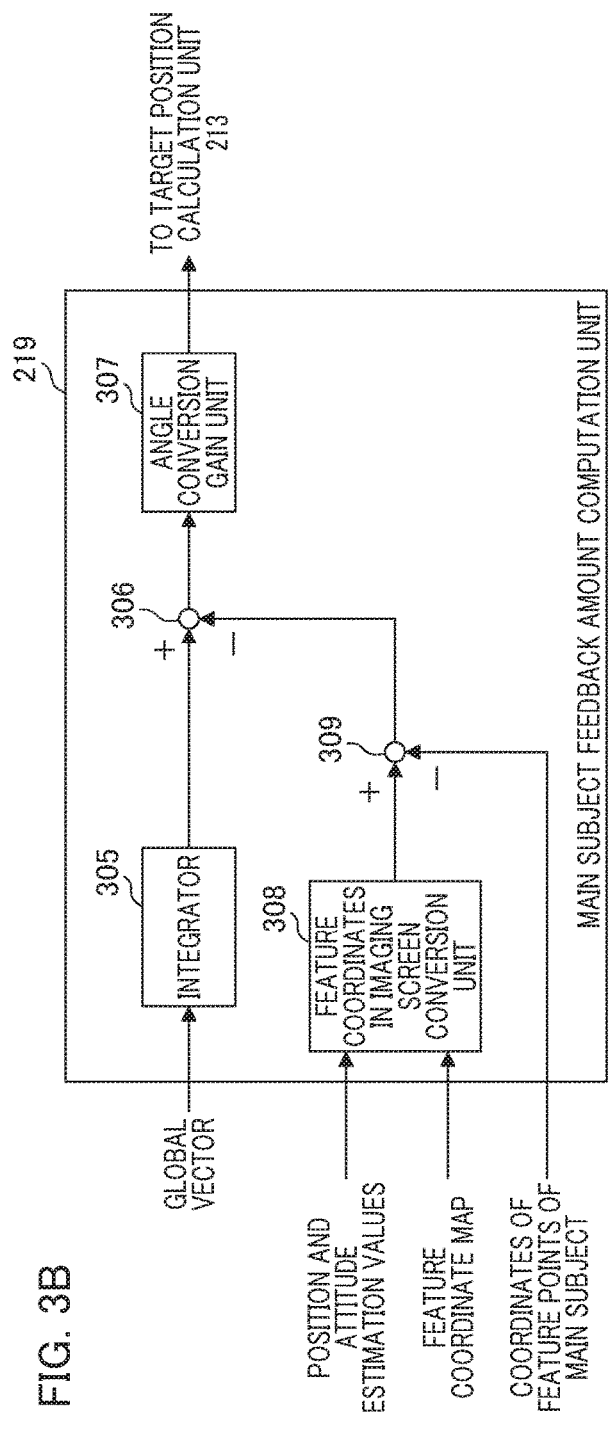

Next, a process of computing a main subject feedback amount performed by the computation unit 219 will be described with reference to FIG. 3B and FIG. 6. FIG. 3B is a diagram showing a detailed internal configuration of the computation unit 219. The computation unit 219 acquires global vector information calculated by the global vector computation unit 220. An integrator 305 integrates global vector information and calculates an amount of movement of pixels in the captured image. A conversion unit 308 acquires the position and attitude estimation values and 3D space feature coordinate map information including depth information estimated by the estimation unit 205 and converts the 3D space feature coordinate map information into feature point coordinates in the captured image.

A first subtractor 309 subtracts an output of the main subject separation unit 208 from an output of the conversion unit 308. The output of the main subject separation unit 208 corresponds to coordinates of feature points of the main subject. The first subtractor 309 outputs the signal after subtraction to a second subtractor 306. The second subtractor 306 subtracts an output of the first subtractor 309 from an output of the integrator 305 and outputs it to an angle conversion gain unit 307. The angle conversion gain unit 307 multiplies by a gain value in order to convert the calculated pixel movement amount into a value corresponding to an angle, and outputs the calculated control amount to the target position calculation unit 213. Thus it will be understood that the computation unit 219 may calculate a control amount of shake correction.

Figure 6:
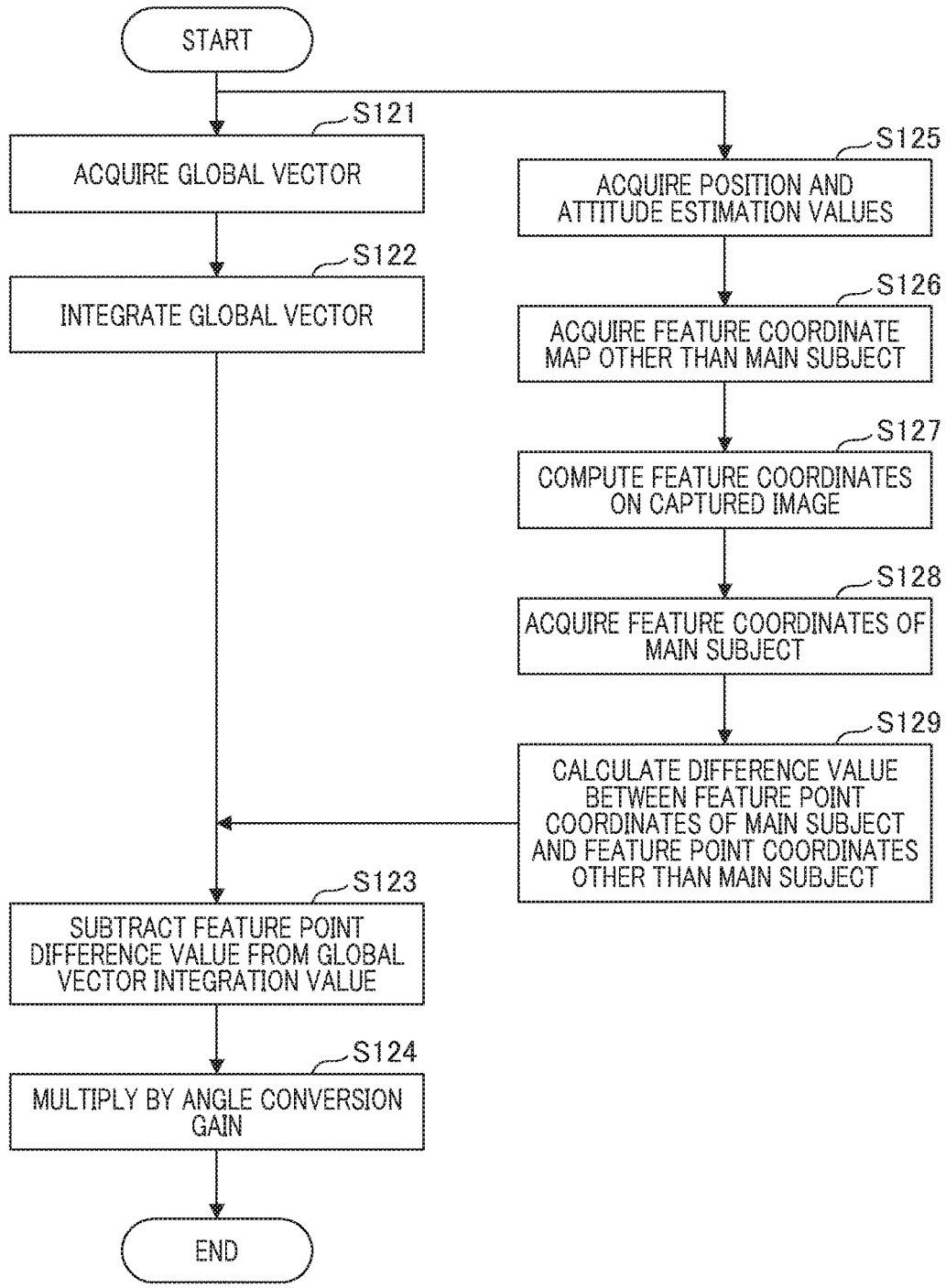
FIG. 6 is a flowchart of a main subject feedback amount computing process according to the first embodiment.

FIG. 6 is a flowchart showing a main subject feedback amount computing process. The processes of S121 and S122 and the processes of S125 to S129 are performed as parallel processes. In S121, the computation unit 219 acquires a global vector calculated by the global vector computation unit 220. Next, the integrator 305 integrates acquired global vector values and calculates a pixel movement amount (S122).

On the other hand, the computation unit 219 acquires the position and attitude estimation values of the image pick-up apparatus 100 estimated by the estimation unit 205 (S125). The computation unit 219 acquires a 3D feature coordinate map including a depth other than the main subject estimated from feature points belonging to an area other than the main subject by the main subject separation unit 208 (S126). The conversion unit 308 converts the 3D feature coordinate map including a depth other than the main subject into 2D feature coordinates in the captured image using feature point coordinates and the position and attitude estimation values of the image pick-up apparatus (S127). First, a process of converting 3D feature coordinates in a world coordinate system of an object other than the main subject into 3D feature coordinates in a camera coordinate system is performed. The world coordinate system is a fixed coordinate system that defines coordinates of an object regardless of a position of a camera. Details will be described with reference to FIG. 7.

Figure 7:
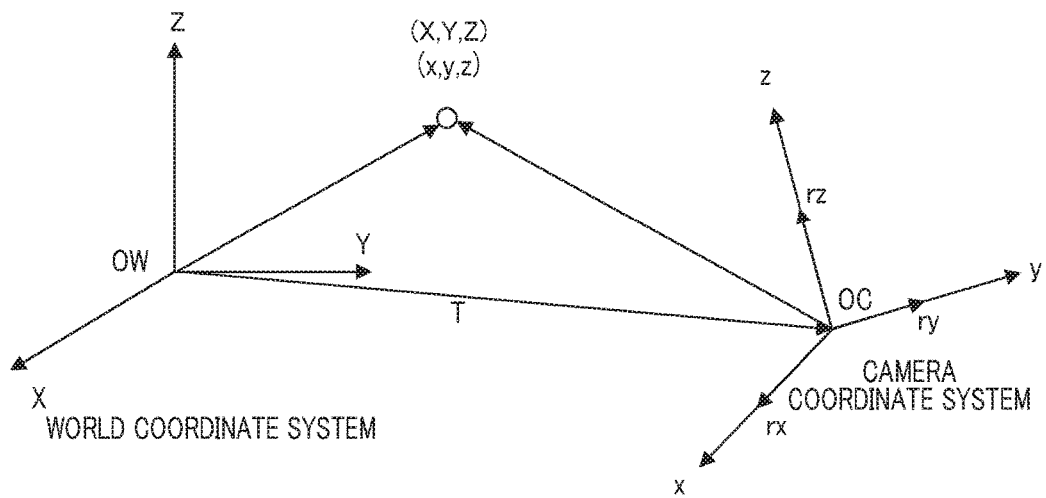
FIG. 7 is a diagram showing the relationship between a coordinate position of an object in world coordinates and a coordinate position in camera coordinates.

FIG. 7 is a diagram showing the relationship between a coordinate position of an object in world coordinates and a coordinate position in camera coordinates. T represents a vector from a starting point OW in world coordinates to a starting point OC in camera coordinates. (rx, ry, rz) represents a unit vector indicating directions of axes (x, y, z) in camera coordinates when viewed in world coordinates. A point (x, y, z) in a camera coordinate system is represented as a point (X, Y, Z) in the world coordinate system. The relationship between these coordinates is as shown in the following Formula 1.

$$\begin{bmatrix} x \\ y \\ z \end{bmatrix} = R \left( \begin{bmatrix} X \\ Y \\ Z \end{bmatrix} - T \right) \quad R = \begin{bmatrix} r_x^T \\ r_y^T \\ r_z^T \end{bmatrix} \quad \text{Formula 1}$$

In Formula 1, R represents a rotation matrix, and T represents a parallel movement vector.

Figure 8:
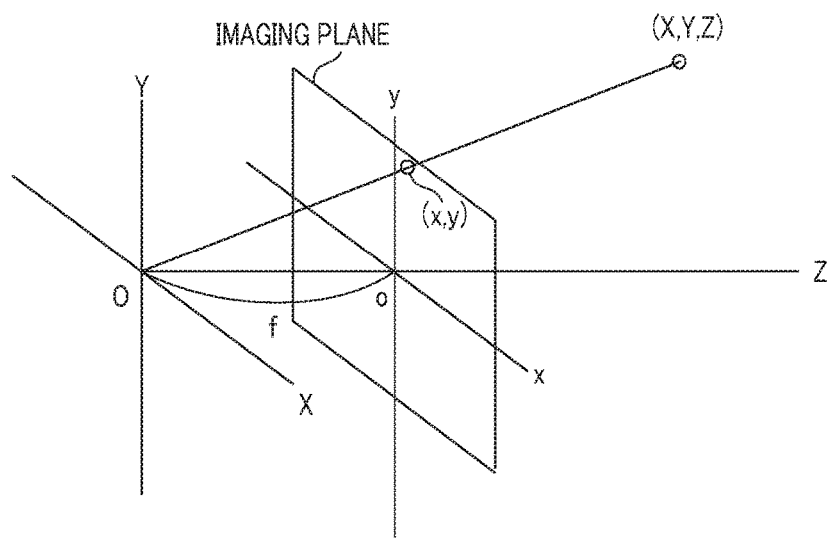
FIG. 8 is a diagram showing a perspective projection model in which a virtual imaging plane is set at a position in front of a lens.

Next, conversion from 3D feature coordinates of the camera coordinate system into image coordinates is performed by, for example, perspective conversion. FIG. 8 shows a perspective projection model when a virtual imaging plane is set at a position of a focus distance f in front of a lens. The point O in FIG. 8 represents the center of a camera lens and Z axis represents an optical axis of a camera. In addition, a coordinate system including the point O as a starting point is called the camera coordinate system. (X, Y, Z) represents a coordinate position of an object in the camera coordinate system. Image coordinates projected from the camera coordinates (X, Y, Z) of an object according to perspective conversion are represented as (x, y). The formula of conversion from (X, Y, Z) to (x, y) is represented by the following Formula 2.

$$x = f\frac{X}{Z}, y = f\frac{Y}{Z} \quad \text{Formula 2}$$

In this manner, a 3D feature coordinate map including a depth other than the main subject can be converted into 2D feature coordinates in the captured image.

In S128 in FIG. 6, feature coordinates belonging to a main subject area separated by the main subject separation unit 208 are acquired. Next, the first subtractor 309 compares movements in moving image frames of feature coordinates of the main subject area acquired in S128 and feature coordinates outside the main subject area estimated in S127. A difference amount is calculated by subtraction processing (S129). The second subtractor 306 subtracts a difference amount calculated in S129 from a movement amount of the global vector calculated in S122 (S123). The angle conversion gain unit 307 calculates a main subject feedback amount by multiplying by a gain value so that a value corresponding to an angle is obtained, and outputs the result to the target position calculation unit 213 (S124). The main subject feedback amount is represented by the following Formula 3.

Main subject feedback amount=global vector movement amount−(feature coordinate movement amount of background area−feature coordinate movement amount of main subject)     Formula 3

In the target position calculation unit 213, the adder 304 adds a main subject feedback amount to a target position of the correction lens 103 calculated on the basis of a detection output of the first vibration sensor 201 (refer to FIG. 3A).

Figure 9A:
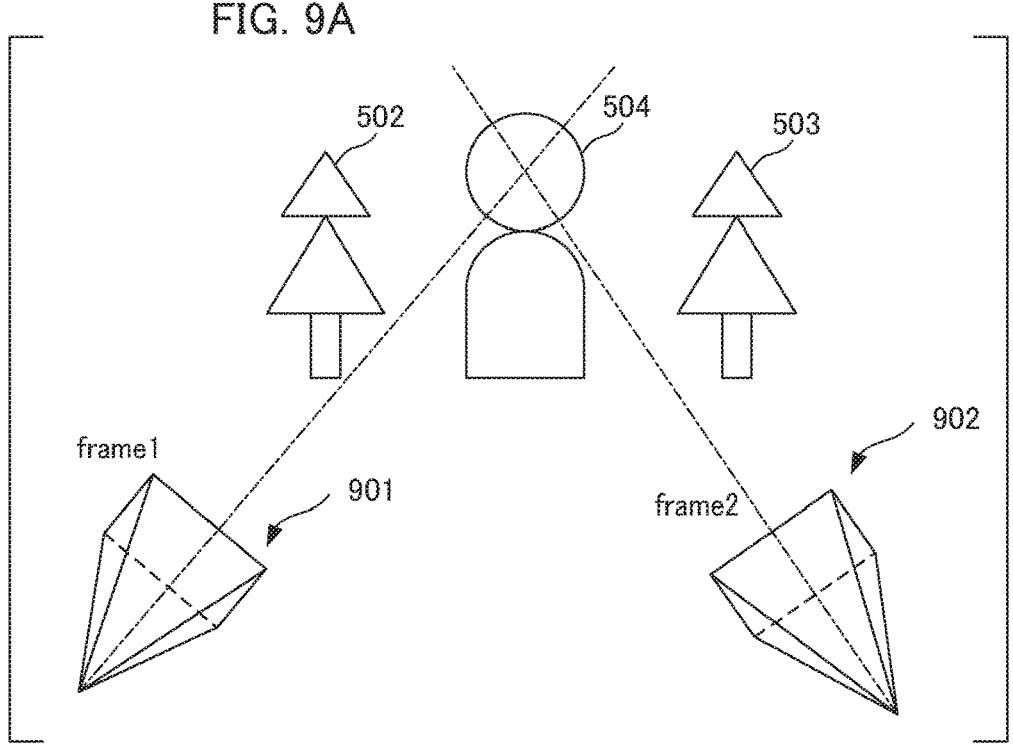
FIG. 9A and FIG. 9B are diagrams showing position and attitude relationships between a main subject, a background subject close to the main subject, and an image pick-up apparatus.
Figure 9B:
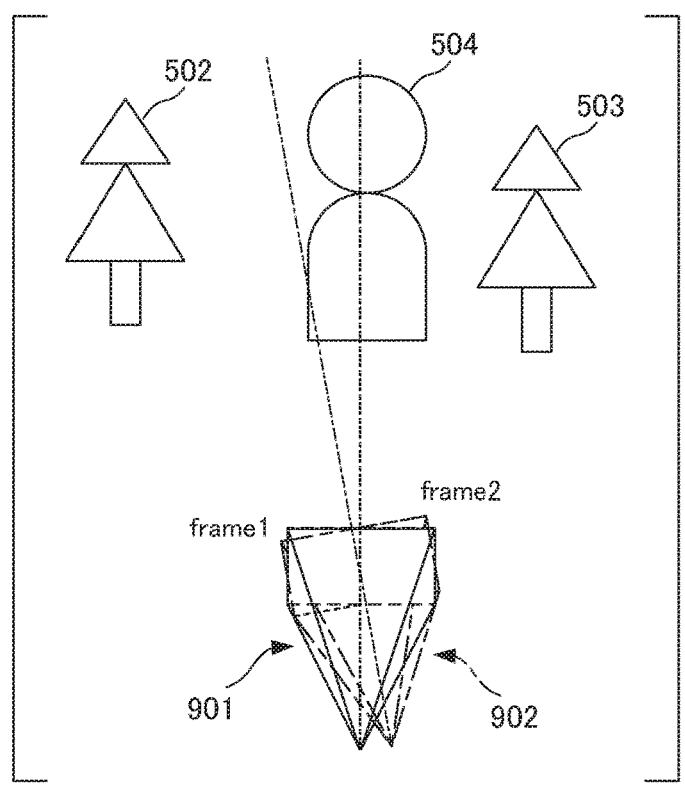
Figure 10A:
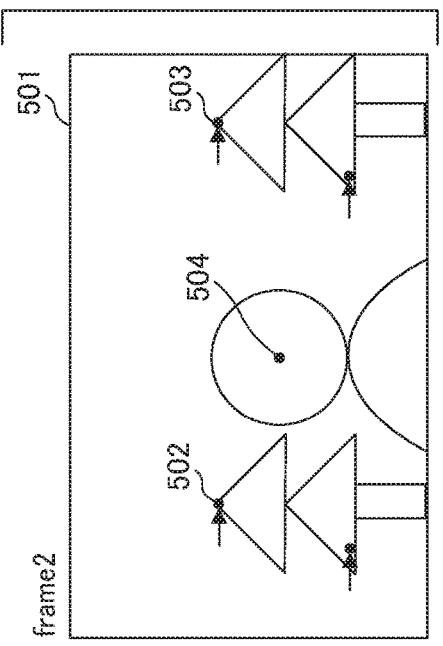
FIG. 10A and FIG. 10B are diagrams showing the relationship between movements of feature points of a main subject and a background in an imaging operation.
Figure 10B:
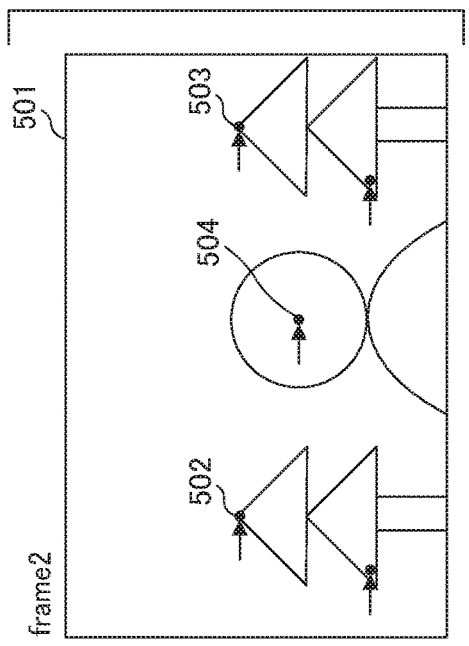

With reference to FIG. 9A and FIG. 9B, and FIG. 10A and FIG. 10B, an effect when a target position to which a main subject feedback amount is added is used for shake correction control will be described. FIG. 9A and FIG. 9B are diagrams showing the positional relationship between camera work (position and attitude change) of an image pick-up apparatus and a subject. FIG. 10A and FIG. 10B are diagrams showing the relationship of feature point coordinates in the captured image during imaging.

FIG. 9A is a schematic diagram showing position and attitude relationships between a main subject 504, background subjects 502 and 503 which are on the back side close to the main subject, and an image pick-up apparatus. A state when a user changes camera work while the main subject 504 is captured at the center of an angle of view when a moving image is captured is shown. A first moving image capturing frame 901 is denoted as a frame 1 and the next second moving image capturing frame 902 is denoted as a frame 2. The example of FIG. 9A shows camera work in which a position and attitude of the image pick-up apparatus are changed.

FIG. 10A schematically shows a positional relationship between feature point coordinates of the background subjects 502 and 503 and the main subject 504 in a captured image 501 during camera work imaging from the frame 1 to the frame 2. FIG. 10A shows camera work imaging in which the main subject 504 remains at the center of an imaging screen. Regarding the positional change of feature coordinates from the frame 1 to the frame 2, a movement amount of feature coordinates of the main subject is relatively smaller than a movement amount of feature coordinates of the background. Coordinates change so that the image of the main subject 504 remains in that place. Therefore, in Formula 3, a global vector movement amount which is the most frequent uniform movement in the entire imaging screen and a feature coordinate movement amount of the background area are in the same movement. The feature coordinate movement amount of the background area in this case is a movement amount obtained by converting 3D feature coordinates including a depth of the background subject 502 or 503 into 2D feature coordinates by the method based on position and attitude estimation values of the image pick-up apparatus. Since the global vector movement amount and the feature coordinate movement amount of the background area are in a relationship in which they are canceled out, the main subject feedback amount is equal to the feature coordinate movement amount of the main subject. According to the main subject feedback amount, the correction lens 103 is controlled so that a movement amount of feature coordinate values of the main subject becomes zero. That is, correction is performed so that a change in coordinate values of the main subject on the imaging screen becomes smaller. Control is performed so that a change in the angle of view due to the camera work causing a movement of the entire imaging screen is not reduced and only a movement of the main subject on the imaging screen is reduced.

FIG. 9B is a schematic diagram showing camera work when only an attitude of the image pick-up apparatus is changed regardless of the position of the main subject 504 in position and attitude relationships between the main subject 504, the background subjects 502 and 503, and the image pick-up apparatus. During change from the frame 1 to the frame 2, an attitude and an imaging direction of the image pick-up apparatus change. FIG. 10B shows a positional relationship between feature point coordinates of the background subjects 502 and 503 and the main subject 504 in the captured image 501 when camera work is captured. In such camera work, imaging not intended by a photographer who aims to intentionally put the main subject in the screen is performed. A change in the angle of imaging view is a change in an angle of view that is desired to be reduced by a photographer, for example, a change in the angle of view due to hand shake or the like. In this case, the feature coordinate movement amount of the background area corresponding to the background subject 502 or 503 and the feature coordinate movement amount of the main subject 504 are in the same movement, and are in a relationship in which they are canceled out. Therefore, the main subject feedback amount is equal to the global vector movement amount according to Formula 3. According to the main subject feedback amount, since the correction lens 103 is controlled so that the most frequent uniform movement amount in the entire imaging screen becomes zero, shake correction is performed so that a change in the angle of view of the entire imaging screen becomes smaller. That is, image blur due to shake of the image pick-up apparatus such as hand shake which causes a change in the angle of view of the entire imaging screen is corrected.

In the present embodiment, when the main subject feedback amount is calculated according to Formula 3, it is possible to determine which of a movement between a movement of the entire imaging screen and a movement of main subject coordinates on the imaging screen is to be reduced without performing a complex determination process.

In a subject tracking operation of the related art, since a movement of a subject is simply determined on a captured image, and correction is performed so that a position of a subject form remains at a specific position, it is not possible to determine whether a movement of the subject on the captured image is caused due to the movement of the subject or due to a movement of the image pick-up apparatus. In addition, in a method of the related art, a magnitude of the movement visible in the captured image due to a difference of depth distances between the subject and the image pick-up apparatus changes, and it is not possible to ascertain an actual movement amount of each subject. On the other hand, in the present embodiment, regarding relationships between feature coordinates of the main subject and the background and the position of the image pick-up apparatus, 3D coordinates including a depth are determined and movements of the subject and the image pick-up apparatus are determined, and thus it is possible to appropriately determine and control respective movements.

In addition, in the present embodiment, using the position and attitude of the image pick-up apparatus estimated in S127 in FIG. 6 and feature coordinates on the captured image estimated from 3D feature coordinates belonging to the background area, it is possible to estimate a movement of the feature points other than the main subject (such as the background). If feature points of the background area tracked on the captured image are moved outside the imaging screen by camera work, it is possible to continue to estimate feature coordinates of the background area. Alternatively, even if feature points are hidden behind another object or even if tracking is not possible due to a change in imaging situation such as a luminance change of the captured image, it is possible to continue to estimate feature coordinates of the background area.

In the present embodiment, in imaging according to camera work for a subject tracking operation, image blur correction is performed by separating a change in the position and attitude of the image pick-up apparatus due to hand shake and a change in the position and attitude due to the camera work. Therefore, it is possible to obtain a favorable captured image in which an unnatural change in the angle of view occurring in a shake correction method of the related art is curbed.

Second Embodiment

Next, a second embodiment of the present invention will be described. The present embodiment is different from the first embodiment in that electronic image blur correction is performed by image processing. In the present embodiment, the same reference numerals are used for parts the same as in the first embodiment and details thereof will be omitted. FIG. 11 is a diagram showing a configuration example of the image blur correction device of the present embodiment. Differences from those of the configuration example shown in FIG. 2 will be described below. In the image blur correction device of the present embodiment, the computation unit 219 outputs the calculated main subject feedback amount to the imaging signal processing unit 110.

In the present embodiment, there is no process of adding a main subject feedback amount to the target position of the correction lens 103 shown in S120 in FIG. 4 in the first embodiment. Alternatively, a process for instructing the imaging signal processing unit 110 regarding a coordinate position at which an image signal is read is performed by the computation unit 219 based on the main subject feedback amount. The imaging signal processing unit 110 performs image blur correction by changing a position at which an image signal after imaging is extracted.

In the present embodiment, it is possible to realize an electronic image blur correction process of changing a coordinate position at which an image signal output from the imaging unit 109 is read. The optical image blur correction process and the electronic image blur correction process can be used together or switched between according to imaging conditions, a shake state, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-150810, filed Aug. 3, 2017, which is hereby incorporated by reference wherein in its entirety.

What is claimed is:

1. An image pick-up apparatus that acquires an image signal by an imaging unit, comprising:
   a memory; and
   one or more processors, wherein the processor functions as the following units according to a program stored in the memory:
   a first acquisition unit configured to acquire first information indicating shake of the image pick-up apparatus detected by a shake detection unit:
   a second acquisition unit configured to acquire second information indicating a movement of a subject detected in an image signal by the imaging unit;
   a tracking unit configured to calculate coordinate values of the subject on an imaging screen using the second information and track feature points;
   an estimation unit configured to estimate a position and/or attitude of the image pick-up apparatus and a positional relationship including a depth between the subject and the image pick-up apparatus from the first information and the coordinate values of the subject;
   a computation unit configured to calculate a control amount of shake correction using (i) the estimation value of the position or attitude of the image pick-up apparatus acquired from the estimation unit, (ii) the positional relationship acquired from the estimation unit, (iii) the first information and (iv) the calculated coordinate values of the subject; and
   a correction unit configured to correct image blur due to shake of the image pick-up apparatus based on the control amount calculated by the computation unit.

2. The image pick-up apparatus according to claim 1, wherein the computation unit calculates the control amount corresponding to a change in the position or attitude of the image pick-up apparatus according to camera work of tracking the subject.

3. The image pick-up apparatus according to claim 1, wherein the shake detection unit is an angular velocity sensor and/or an acceleration sensor.

4. The image pick-up apparatus according to claim 1, wherein the processor further function as a separation unit configured to acquire an output of the tracking unit and separate feature points of a first subject and feature points of a second subject,
wherein the separation unit outputs coordinates of the feature points of the second subject to the estimation unit.

5. The image pick-up apparatus according to claim 4, wherein the estimation unit generates feature coordinate map information related to 3D position coordinates in a real space from the first information and coordinate change information related to the feature points of the second subject calculated by the separation unit, and calculates the estimation value of the position or attitude of the image pick-up apparatus using the feature coordinate map information and the coordinates of the feature points of the second subject calculated by the separation unit.

6. The image pick-up apparatus according to claim 4, wherein the processor further functions as a calculation unit configured to acquire the second information and calculate a global vector representing a movement of the entire imaging screen,
wherein the computation unit computes a difference between a movement amount of the feature points of the second subject acquired from the estimation unit and a movement amount of the feature points of the first subject acquired from the separation unit, and calculates a feedback amount by subtracting the difference from the global vector and outputs the feedback amount to the correction unit.

7. The image pick-up apparatus according to claim 5, wherein the first subject is a main subject and the second subject is a background, and
wherein the estimation unit estimates a movement of the feature points of the second subject using the position or attitude of the image pick-up apparatus and feature coordinates on a captured image estimated from 3D feature coordinates belonging to an area of the second subject.

8. The image pick-up apparatus according to claim 5, wherein the computation unit includes:
a conversion unit configured to (i) acquire the estimation value of the position or attitude of the image pick-up apparatus and the feature coordinate map information from the estimation unit and (ii) convert the feature coordinate map information into feature coordinates on an imaging screen; and
a subtraction unit configured to subtract a movement amount of the feature points of the first subject from an output of the conversion unit.

9. The image pick-up apparatus according to claim 8, wherein the computation unit and the correction unit perform control such that a change in the coordinate values of the first subject in the imaging screen becomes smaller when the movement amount of the feature points of the first subject is smaller than a movement amount of the feature points of the second subject.

10. The image pick-up apparatus according to claim 8, wherein the computation unit and the correction unit perform control such that a change in the entire imaging screen due to shake becomes smaller when a movement amount of the feature points of the second subject and the movement amount of the feature points of the first subject are the same.

11. The image pick-up apparatus according to claim 1, wherein the processor further functions as:
a separation unit configured to acquire an output of the tracking unit and separate feature points of a first subject and feature points of a second subject,
wherein the separation unit outputs coordinates of the feature points of the second subject to the estimation unit, and
wherein the computation unit calculates the control amount corresponding to a change in the position or attitude of the image pick-up apparatus according to camera work of tracking the subject.

12. The image pick-up apparatus according to claim 11, wherein the estimation unit generates feature coordinate map information of 3D position coordinates from the first information and coordinate change information related to the feature points of the second subject calculated by the separation unit, and calculates the estimation value of the position or attitude of the image pick-up apparatus using the feature coordinate map information and the coordinates of the feature points of the second subject calculated by the separation unit.

13. The image pick-up apparatus according to claim 12, wherein the first subject is a main subject and the second subject is a background, and
wherein the estimation unit estimates a movement of the feature points of the second subject using the position or attitude of the image pick-up apparatus and feature coordinates on a captured image estimated from 3D feature coordinates belonging to an area of the second subject.

14. The image pick-up apparatus according to claim 12, wherein the computation unit includes a conversion unit configured to acquire the estimation value of the position or attitude of the image pick-up apparatus and the feature coordinate map information from the estimation unit and convert the feature coordinate map information into feature coordinates on an imaging screen and a subtraction unit configured to subtract a movement amount of the feature points of the first subject from an output of the conversion unit.

15. The image pick-up apparatus according to claim 14, wherein the computation unit and the correction unit perform control such that a change in the coordinate values of the first subject in the imaging screen becomes smaller when the movement amount of the feature points of the first subject is smaller than a movement amount of the feature points of the second subject.

16. The image pick-up apparatus according to claim 14, wherein the computation unit and the correction unit perform control such that a change in the entire imaging screen due to shake becomes smaller when a movement amount of the feature points of the second subject and the movement amount of the feature points of the first subject are the same.

17. A method executed in an image pick-up apparatus that acquires an image signal by an imaging unit, the method comprising:
acquiring first information indicating shake of the image pick-up apparatus detected by a shake detection unit and second information indicating a movement of a subject detected in an image signal by the imaging unit;
calculating coordinate values of the subject on an imaging screen using the second information and tracking feature points;
estimating a position and/or attitude of the image pick-up apparatus and a positional relationship including a depth between the subject and the image pick-up apparatus from the first information and the coordinate values of the subject;

calculating a control amount of shake correction using (i) the estimated position or attitude of the image pick-up apparatus, (ii) the positional relationship, (iii) the first information, and (iv) the calculated coordinate values of the subject; and correcting image blur due to shake of the image pick-up apparatus based on the control amount calculated in the calculating.

* * * * *